US006405449B1

(12) United States Patent
Sundaram et al.

(10) Patent No.: US 6,405,449 B1
(45) Date of Patent: *Jun. 18, 2002

(54) RECOGNIZING AND COMPENSATING FOR DISK SHIFT IN COMPUTER DISK DRIVES

(75) Inventors: Ramesh Sundaram; Wei Yao; Li-Ping Wang, all of Fremont; David Shiao-Min Kuo, Palo Alto, all of CA (US)

(73) Assignee: Seagate Technology, LLC, Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/779,220

(22) Filed: Feb. 7, 2001

Related U.S. Application Data

(63) Continuation of application No. 09/325,887, filed on Jun. 4, 1999, now Pat. No. 6,301,797
(60) Provisional application No. 60/088,335, filed on Jun. 4, 1998, and provisional application No. 60/088,127, filed on Jun. 4, 1998.

(51) Int. Cl.⁷ ............................. B65G 47/22; G01B 9/00
(52) U.S. Cl. ............................. 33/645; 33/551; 414/935
(58) Field of Search .......................... 33/645, 520, 533, 33/613; 414/936

(56) References Cited

U.S. PATENT DOCUMENTS

| | | | |
|---|---|---|---|
| RE32,464 E | | 7/1987 | Aine |
| 4,880,348 A | * | 11/1989 | Baker et al. ................ 414/936 |
| 4,887,904 A | * | 12/1989 | Nakazato et al. ........... 414/936 |
| 5,095,396 A | | 3/1992 | Putnam et al. |
| 5,125,791 A | * | 6/1992 | Volovich .................... 414/936 |
| 5,365,672 A | * | 11/1994 | Kato ........................... 33/520 |
| 5,822,213 A | * | 10/1998 | Huynh ........................ 33/520 |
| 5,851,102 A | * | 12/1998 | Okawa et al. ............... 414/936 |
| 6,301,797 B1 | * | 10/2001 | Sundaram et al. ............ 33/645 |

* cited by examiner

*Primary Examiner*—Christopher W. Fulton
(74) *Attorney, Agent, or Firm*—LaRiviere, Grubman & Payne, LLP

(57) ABSTRACT

A method and apparatus for data disks adapted to compensate for effects of shock loads imparted to a disk drive which are of sufficient magnitude to cause disk shifts. A series of topographical features are formed on the disk surface or edge to cause signal fluctuation in a sensor during read-back mode operation. An initial signal profile is stored as a map indicative of track or disk alignment with respect to the actuator assembly. Selectively, such as after a known shock event, the topographical features are re-profiled. A comparison of the profiles provides a measure of any track distortion which must be compensated for in future read-write operations by adjustments to data track servo follower algorithms.

8 Claims, 8 Drawing Sheets

AFTER SLIP

Head motion & track out of alignment

BEFORE SLIP

Head motion & track aligned

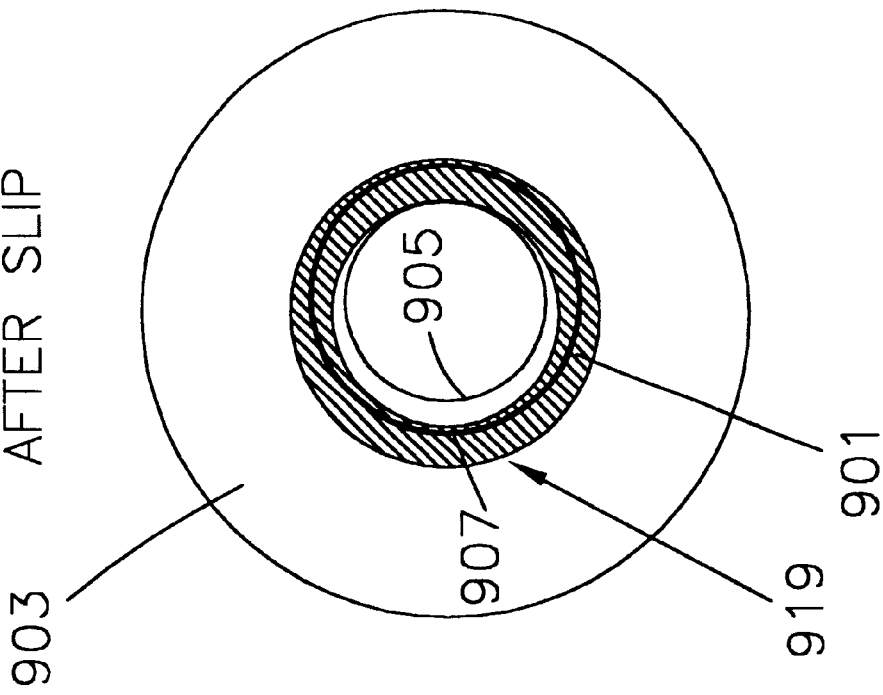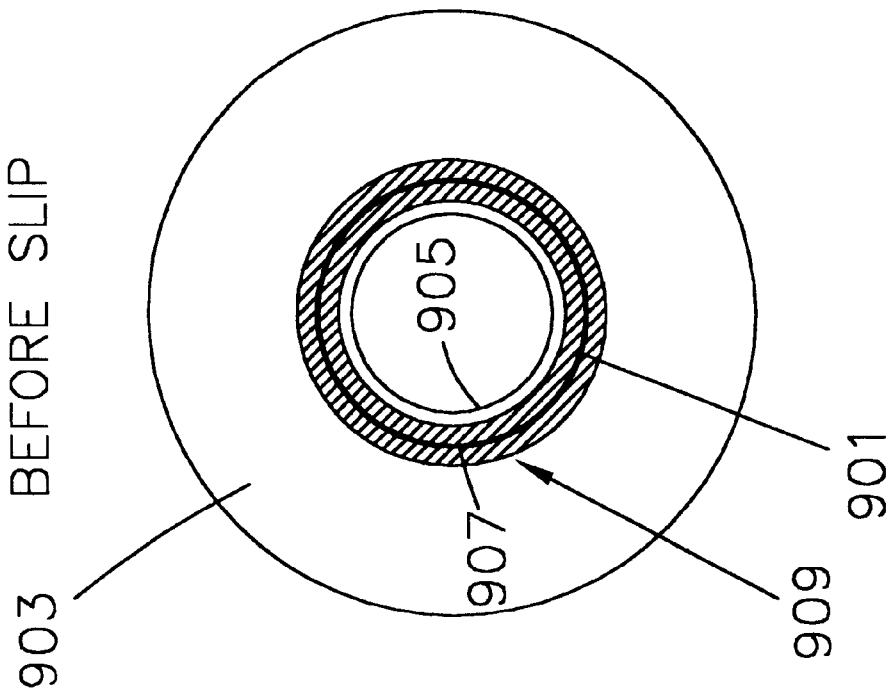

RECOGNIZING AND COMPENSATING FOR DISK SHIFT IN COMPUTER DISK DRIVES

CROSS REFERENCE TO RELATED APPLICATION

This application is a continuation of application Ser. No. 09/325,887, filed Jun. 4, 1999, now U.S. Pat. No. 6,301,797, issued Oct. 16, 2001 which claims benefit of Ser. No. 60/088,335 and Ser. No. 60/088,1127 filed Jun. 4, 1998.

BACKGROUND OF THE INVENTION

1. Field of the Invention

The present invention relates generally to rotating disk technology, particularly to disk drive apparatus employed as a memory device and, more specifically, to a technique for determining computer hard disk alignment and alignment shifts and for providing compensation.

2. Description of the Related Art

In the state of the art of digital data storage, hard disks form the basis for main memory in most computer systems. Hard disk drives provide rapid access to a very large number of data records. Magnetic storage hard disk drives are faster than floppy disk, magnetic tape, and optical disk drives, and cost less than equivalent capacity semiconductor memory. Fundamentals of magnetic recording and disk drives can be found in *The Complete Handbook of Magnetic Recording* by Finn Jorgensen, copyright 1988 (3rd Edition, TAB BOOK Inc., Blue Ridge Summit, Pa.)

FIG. 1 (Prior Art) illustrates the fundamental components of a computer memory, hard disk apparatus (generally referred to simply as the "hard drive"), head-disk assembly 101. A stack 103 of individual disks 103a, each having magnetic recording surface layers (on both sides of the disk), rotates (arrow 105) at a constant speed (e.g., approximately 5400 RPM) on a hub 106 suitably mounted on a base plate 108. Mounted in a head stack assembly 111, load beams 107 extend magnetic transducers ("heads") 109 which are selectively positioned with respect to each disk's recording surface in order to read and write digital data on the disks 103a (see also FIG. 2). A coil 113 on the head stack assembly 111 interacts with a magnetic drive subassembly 117 to swing the head stack assembly via a rotary shaft, or pivot bearing, 115 reversibly driven about the shaft axis, selectively moving the heads 109 from the inner diameter data tracks to the outer diameter data tracks of the recording surfaces. Appropriate electronics (not shown) are provided for controlling positioning and performing read/write functions via the heads 109. (See also FIG. 2 regarding disk formatting). The head stack assembly 111 in combination with the magnetic drive subassembly 117 and pivot bearing 115 is referred to as the "actuator assembly. " In the state of the art, the typical read/write head may have physical dimensions of approximately 0.080-inch by 0.00125-inch; the height of the head above the disk surface may be on the order of approximately 0.75-micro-inch. Because of its shape, the head stack assembly main body part which encompasses the rotary shaft 115 is referred to as an "E-block." A unitary E-block assembly for use in a disk drive is disclosed in U.S. Pat. No. 5,095,396 (Putnam et al., assigned to the common assignee of the present invention.)

FIG. 2 (Prior Art) illustrates the fundamental constructs (dimensions exaggerated) involved in recording data on a magnetic disk 203. Physically, a hard drive disk comprises an aluminum substrate platter having a series of thin film layers thereon used in the data recording process and an outer, protective lubricant layer open to the environment (see e.g., U.S. Pat. No. Re. 32,464 (Aine) and its related patents). The disk 203 is formatted by dividing it into sectors 212 by a number of radially-extending spokes 214 placed at regular angular intervals about the disk. The spokes 214 are areas on the disk containing tracking servo bursts and sector identification information. The sectors 212 are areas on the disk containing data blocks 216, each block having a fixed amount of data, for example 512-bytes. The data blocks 216 occupy circular tracks 218. The tracks 218 are grouped into bands 220; all of the tracks 218 in a given band 220 contain the same number of radially aligned data blocks 216. The section of a band 220 where a set of radially aligned data blocks 16 is recorded is called a block frame 222. The number of block frames 222 per band increases with band 220 radius. The beginning and end of a block frame 222 are defined by a timing system in a disk controller (not shown). The number of bands 220 is maximized if each band has exactly one more block frame 222 than its inwardly adjacent band. In that case, the number of bands 220 is simply the difference between the number of block frames 222 in the outermost band and the number of block frames in the innermost band. The spokes 214 are numbered, e.g., zero to seven, in the direction opposite to disk rotation. The sectors 212 are also numbered, each sector being numbered the same as the immediately preceding spoke 214. The block frames 222 in each band 220 are numbered starting from zero; block frame zero in each band is adjacent to spoke zero. In order to maximize storage capacity of the disk 210, the data blocks 216 along the innermost track 218 of each band 220 are recorded as close as possible to a predetermined maximum linear bit density. As a result, the data rate in megabytes per second in each band increases with radius. The number of tracks 218 is predetermined for a given disk, normally spaced as close as possible to maximize storage density. In the state of the art, typical track density is approximately fifteen thousand (15,000) TPI; a typical data bit density is approximately two-hundred twenty thousand (220,000) BPI; average access time to find any particular data stream is approximately five-to nine milliseconds, holding several gigabytes of information.

The location of any recorded programs and data is stored in a directory area on a disk and informs the disk operating system about the exact sector and track number where the recorded data are to be found. Servo burst signals recorded in the spokes 214 provide positioning information; generally, amplitude and phase of servo-signals provide correction signals to the motor drive electronics associated with the actuator assembly. As known in the art, the design of servo-follower mechanisms, associated electronics, and optimized servo-tracking algorithms requires an analysis of the specific disk drive design implementation. While servo-tracking algorithms can provide for track following where small distortions are involved (e.g., ±100-microinch), inherent limitations in servo-tracking algorithms limits the tracking correction which is available for gross track shifts such as might occur if the head-to-track alignment is skewed, such as by a shock event. With the recognition of the advanced state of the art of such servo technology, a further detailed description is not necessary to an understanding of the present invention for a person skilled in the art.

As should now be recognized, considering the speed of the disk, the size of the heads, the complex data formatting on the disk, servo-follower limitations, and the high track and bit densities, for reliable read/write functionality it is critical that head-to-track alignment be precise.

Disk drive durability has to be maintained under sometimes severe environmental conditions, particularly during computer assembly and in the actual use of portable computers. One of the parameters that affect drive durability is shock, used to describe impact loading of drives. Shock is characterized by its magnitude in G-forces and shock duration. In disk drive technology, withstanding a shock implies that the head-media interface reliability is not compromised due to violent dynamic response of drive components following the shock event. To improve drive insensitivity to both computer assembly process, transportation, in-use handling conditions, and any other environmental situation in which a shock might be imparted to a unit, drive manufacturers are forced to design systems able to withstand higher G-forces over shorter durations; an exemplary shock load specification goal is for a disk drive to withstand a shock of 1000-G's at 1-millisecond without affecting performance.

One of the primary drive failure modes caused by a shock event is referred to as "disk shift" or "disk slippage." As shown in FIGS. 3A and 3B and discussed in more detail elsewhere in this specification, following a shock event, disk shift may have changed the head-to-rack alignment. Due to a gross shift of written tracks of a formatted disk, the head is unable to follow during a read cycle, resulting in data read mode failures. There is a need for a method and apparatus for facilitating the determination of and compensation for disk shifts.

SUMMARY OF THE INVENTION

In a basic aspect, the present invention provides a method for profiling alignment of a rotating disk having a given radius. The method includes the steps of: providing a predetermined marker on a periphery of the rotating disk; and starting at the marker, as the disk revolves about its axis of rotation, plotting variations of proximity of the periphery of the disk between the periphery and a predetermined radial position greater than the given radius such that a plot of the variations from the marker over one revolution constitutes an initial alignment profile of the disk to the predetermined radial position. By periodically re-plotting variations of proximity of the periphery of the disk between the periphery and a predetermined radial position greater than the given radius, the re-plot of the variations from the marker over one revolution constitutes a secondary alignment profile of the disk to the predetermined radial position. The comparison of the plot to the re-plot is indicative of a change of alignment of the rotating disk.

In another basic aspect, the present invention is used in a computer memory hard disk drive, having at least one disk having a given radius and a given initial axis of rotation, the drive including at least one transducer, movably mounted for reading data recorded on concentric tracks of the disk. A method for determining disk shift includes the steps of: providing a predetermined edge marker on a periphery of each rotating disk; starting at the edge marker, creating a first plot of variations of proximity of the periphery of the disk to a predetermined radial position greater than the radius as the disk revolves about the given initial axis of rotation; storing the first plot as a first reference data set; periodically, starting at the edge marker, creating a second plot as a second reference data set of variations of proximity of the periphery of the disk to the predetermined radial position greater than the radius as the disk revolves; comparing the first data set with the second data set; and determining disk shift as a function of differences between the first data set and the second data set.

In another basic aspect of the present invention, a computer memory hard disk drive is provided, having at least one disk having a given radius and a given initial axis of rotation, the drive including at least one selectively positionable transducer for reading data recorded on concentric tracks of the disk. A method for determining and compensating for disk shift includes the steps of: starting at a point on an outer diameter of the disk, creating a first data set indicative of variations of proximity of the periphery of the disk to a predetermined radial position greater than the radius as the disk makes a single rotation about the axis; storing the first data set; periodically, starting at the point, creating a second data set of variations of proximity of the periphery of the disk to a predetermined radial position greater than the radius as the disk makes a single rotation; comparing the first data set with the second data set; determining disk shift as a function of differences between the first data set and the second data set; and if the disk shift is a function value greater than a predetermined transducer-to-track alignment tolerance, compensating transducer-to-track following by the function value.

Another basic aspect of the present invention is a hard disk adapted for use as a memory apparatus; the disk includes: a substrate; superjacent the substrate, at least one thin film layer associated with recording digital data in a plurality of tracks thereon; and at least one topographical anomaly located in a peripheral edge of the disk providing a marker such that proximity variations of the peripheral edge to an edge proximity detector can be plotted as a function of angular location with respect to the marker as the disk rotates past the edge proximity detector.

Another basic aspect of the present invention is a disk drive read-write head gimbal assembly mount adapted for positioning at least one read-write transducer with respect to a rotating disk, the head gimbal including: body mechanisms for positioning the read-write transducer with respect to a recording surface of the rotating disk; and mounted on the body mechanisms, detecting mechanisms for measuring proximity variations between the body mechanisms and the recording surface as the disk rotates past the detecting mechanisms.

In another basic aspect, the present invention provides a computer memory disk drive system. The system includes: at least one recording disk having a plurality of concentric data tracks thereon, the disk having an outer diameter edge at a predetermined radius and an axis of rotation; at least one transducer positionable for at least reading information contained on the data tracks; a transducer mount, movably mounted adjacent to the recording disk, for selectively positioning the transducer with respect to concentric tracks on the disk; attached to the mount, at least one proximity detector for alignment of the transducer to the tracks.

In another basic aspect, a predetermined alignment feature is embedded into the recording surfaces of a disk. As is known in the art, a change in spacing between the head and the disk surface can be recognized as magnetic or thermal flux variations. For a magnetic disk, a sequential series of individual surface anomalies that are recognizable by the read head can be scribed or are embedded in the alignment track. Thus, from a start/stop gap of the feature, a series of surface anomalies is scribed along the predetermined alignment track which will induce a pattern of such effects in the read head when in a read-back-mode and aligned to that track as the disk spins. In commercial application, each disk is implanted with the alignment track feature before incorporation into a head-disk assembly. Next, the alignment track is mapped and stored. The drive's read head is used in a read-back-mode to digitally describe an initial profile, or map, of the alignment track. A digital pattern representation of the initial profile is stored as read-only data in a memory by any known manner or proprietary data processing program. The initial profile is now available for use in various operational modes of the disk drive. When a disk shift test is called for, a current profile of the test track is made and stored using the head in a read-back-mode simply by running the read head about the alignment track, reading the predetermined feature and storing the current profile. The two stored maps, the initial profile and the current profile are compared. If the maps are identical, or within a predetermined tolerance defined for a specific implementation knowing the drive's particular servo-tracking algorithm limitations, the system standard read-write mode can be initiated. If it is determined that significant track distortion has occurred due to disk shift, the servo-tracking algorithm is modified to conform track following in all future read-write mode operations. The servo-tracking modification is simple as the distortion is a direct function of track angular location to the initial configuration. Thus, the track position compensation value is a constant. The data processing involved in mapping, storing, and comparing alignment track profiles can be implemented in either a firmware and semiconductor memory form or in software as part of a disk drive's software driver program.

In a further basic aspect, the present invention provides a method for determining a shift of a disk having a plurality of tracks thereon. The method includes the steps of: forming a series of fixed anomalies on a surface of the disk; forming an initial profile of track alignment based on a positional profile of the series of fixed anomalies; storing the initial profile; periodically forming a current profile of the series of fixed anomalies; comparing the initial profile to the current profile; and deriving a measurement of disk shift from detected differences between the initial profile and the current profile.

In a further basic aspect, the present invention provides a method for determining and compensating for disk slippage of a computer memory disk having a plurality of data tracks thereon in a disk drive having a read head adapted for following the data tracks. The method includes the steps of: forming a series of fixed anomalies on a surface of the disk; forming an initial profile of data track alignment from the series of fixed anomalies; periodically forming a current profile of data track alignment from the series of fixed anomalies; comparing the initial profile to the current profile; deriving a measurement of disk shift from detected differences between the initial profile and the current profile; and adjusting data track following in conformance with the measurement of disk shift.

In a further basic aspect, the present invention provides a track alignment pattern for a disk shaped data recording medium having at least one recording surface thereon, the surface adapted for having a plurality of concentric recording tracks thereon, the pattern comprising a sequence of geometric features scribed onto the recording surface of the disk in at least one predetermined track at a substantially constant radial distance from the axis of rotation of the disk, forming a pattern for mapping concentric alignment of the disk with respect to the axis of rotation.

In a further basic aspect, the present invention provides a computer memory disk adapted for use with a read head, the disk including: a substrate; superjacent the substrate, at least one thin film layer associated with recording digital data therein; and a series of anomalies in the thin film layer such that the anomalies are identified by the read head as an alignment feature for the disk.

In a further basic aspect, the present invention provides a disk drive including: at least one recording disk having a plurality of concentric data tracks thereon; at least one transducer for at least reading information contained on the data tracks; at least one of the data tracks being a predetermined track having a set of topographical features embedded thereon such that the transducer is usable as a mechanism for forming an initial profile of the predetermined track having a set of topographical features embedded thereon wherein the initial profile is an initial track alignment map of the plurality of concentric tracks; and mechanisms for selectively forming a current profile of the predetermined track having a set of topographical features embedded thereon and for comparing the current profile to the initial profile and for resetting data track following of the transducer to compensate for differences between the initial profile and the current profile.

It is an advantage of the present invention that it provides a method for accurately determining and compensating for disk shifts.

It is another advantage of the present invention that relatively gross disk slippage can be accommodated with little impact to the read/write performance of the drive.

It is another advantage of the present invention that it can be implemented with no changes to either the heads or the fundamental media design.

It is another advantage of the present invention that it provides a disk drive that can withstand higher shocks without affecting performance.

It is still another advantage of the present invention that it overcomes limitations in servo-tracking algorithms ability to compensate for data track shifts.

It is a further advantage of the present invention that it provides a mechanism for determining shock event disk shift effects without requiring contact with the disks.

It is a further advantage of the present invention that it requires no added hardware to the disk drive construct.

The foregoing summary and list of advantages is not intended by the inventors to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprize the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

BRIEF DESCRIPTION OF THE DRAWING

FIGS. 9A and 9B are a schematic representation of a geometric feature of a disk in accordance with the present invention as set forth in FIG. 8 in which:

FIG. 9A shows a before slippage mapping, and

FIG. 9B shows an after slippage mapping thereof.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
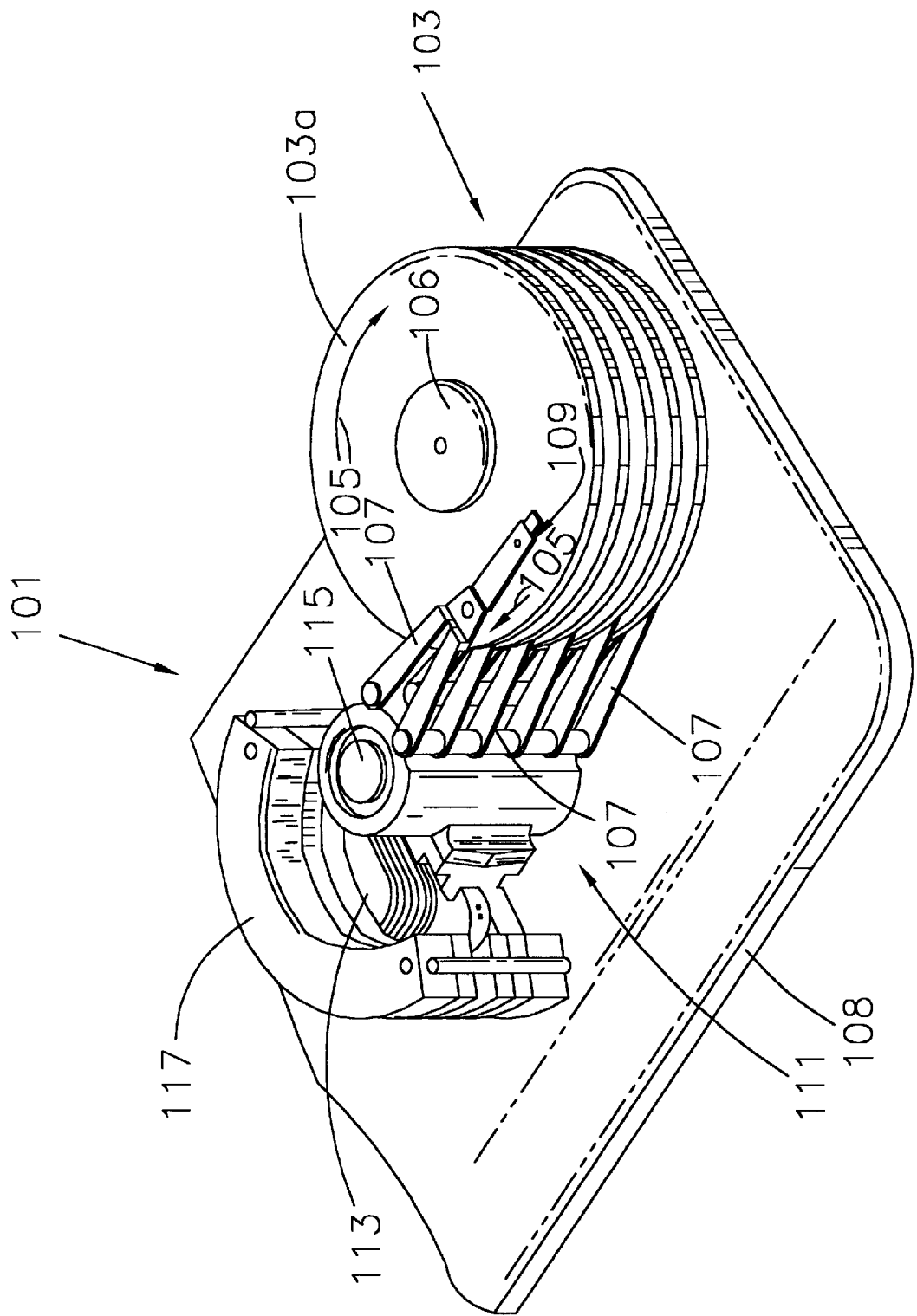
FIG. 1 (PRIOR ART) is an illustration of a computer memory hard disk drive actuator assembly.
Figure 2:
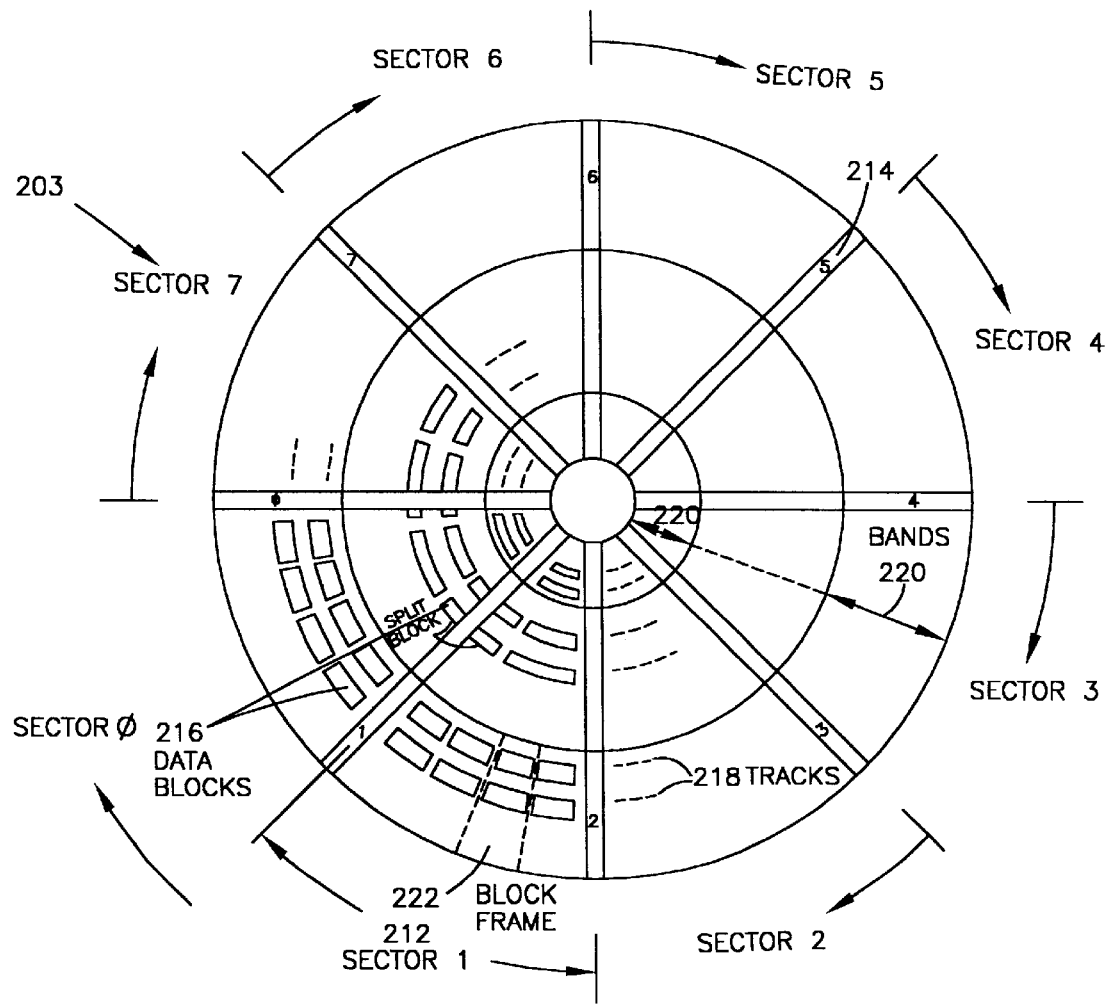
FIG. 2 (PRIOR ART) is a schematic representation of a computer memory disk, showing formatting thereon, as used in a head stack assembly of the actuator assembly of FIG. 1.
Figure 3B:
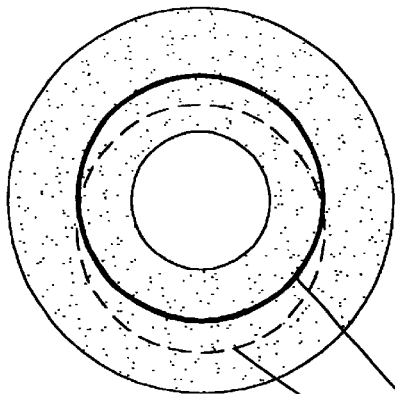
FIGS. 3A and 3B are graphical demonstrations of the problem of head-track misalignment.
Figure 3A:
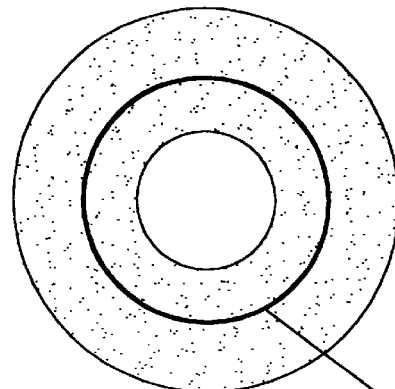
Figure 4:
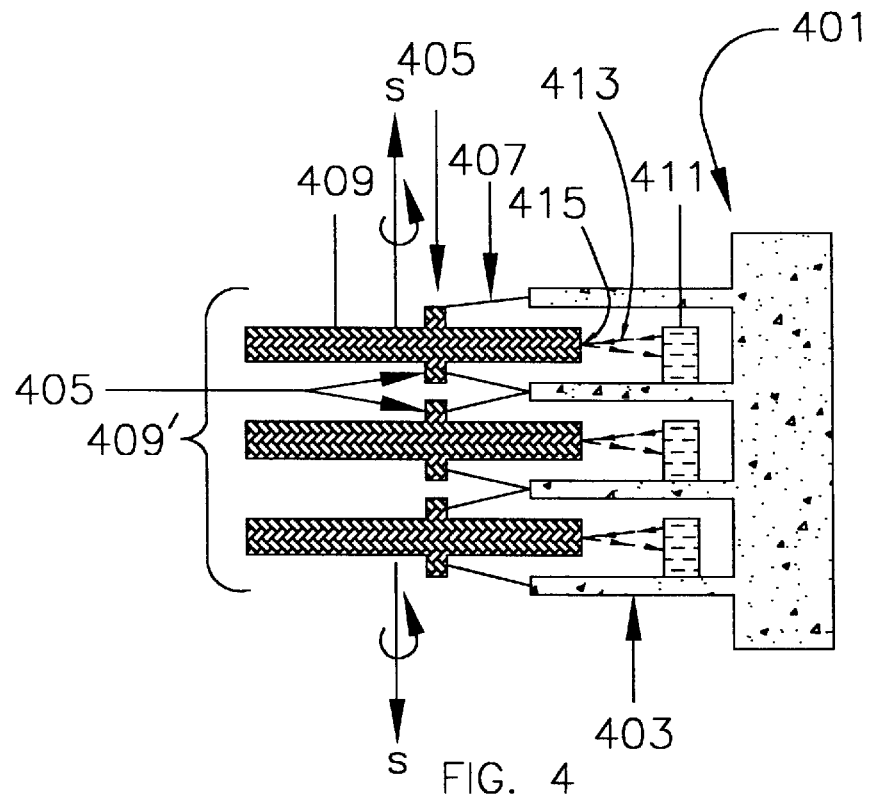
FIG. 4 is a schematic illustration, elevation view, of a first embodiment of the present invention.

Turning to FIG. 4, a simplified schematic representation of the present invention is shown. An E-block 401 includes a plurality of cantilevers 403. Read-write heads, or slider, 405 are mounted to the E-block cantilevers 403 on extension arms suspensions 407; in combination, the suspensions and cantilevers are also referred to in the art as a "load beam assembly." The load beam assembly 403, 407 essentially provides the mechanical interface for flying the heads 405 across the recording surfaces of each disk 409 while the disk is rotating about the axis of rotation S—S ("disk spin"). A disk edge, or "outer diameter," sensor 411 for each disk 409 of the stack 409' is mounted on the cantilevers 403. A suitable, commercially available, optical sensor can be employed in accordance with the present invention. Other types of proximity and alignment sensitive devices known in the art, such as capacitance probes, can also be employed in accordance with the present invention. With optical sensors 411, a beam of light 413 is projected onto the edge 415 of each disk 409 and a return beam received back by a photodetector cell of the sensor, measuring instantaneous proximity of the disk edge 415 to the sensor 411. In order to be useful for head-to-track alignment, it is appropriate to position the transducer head 405 over a known, reference track when creating a plot of the edge 415 proximity to the fixed position sensor 411; this is discussed further with respect to FIG. 5 below.

Figure 6:
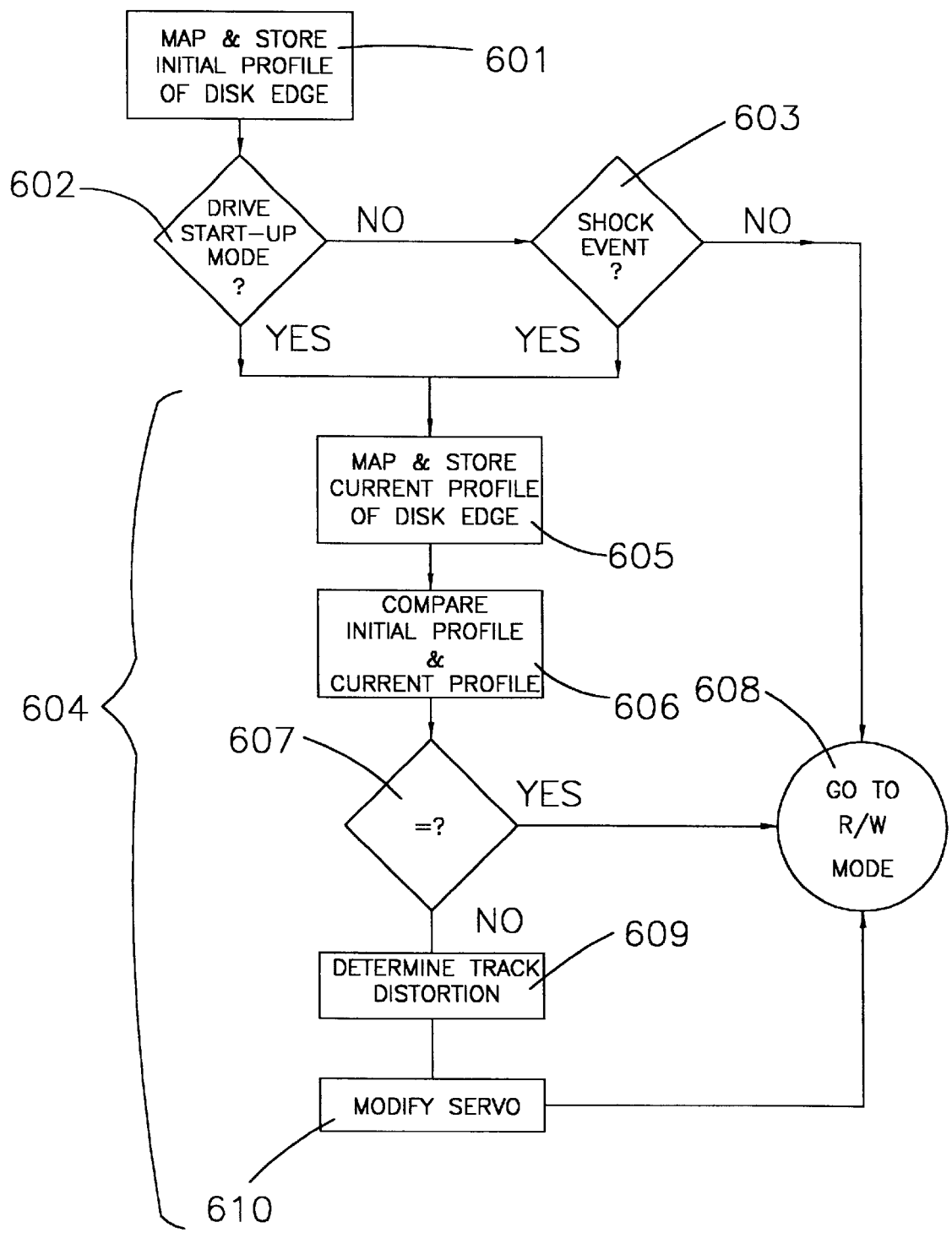
FIG. 6 is a flow chart of the methodology for determining and compensating for data track profile distortion due to disk shift in accordance with the present invention as shown in FIGS. 4 and 5.

Referring also to FIG. 6, when a disk drive is built or following assembly into a computer system, the sensors 411 adjacent respective disks 409 of the stack are used to create an initial alignment profile(s) which is digitized and stored in a memory based on the data produced by the sensor as a disk rotates past, step 601.

Figure 7:
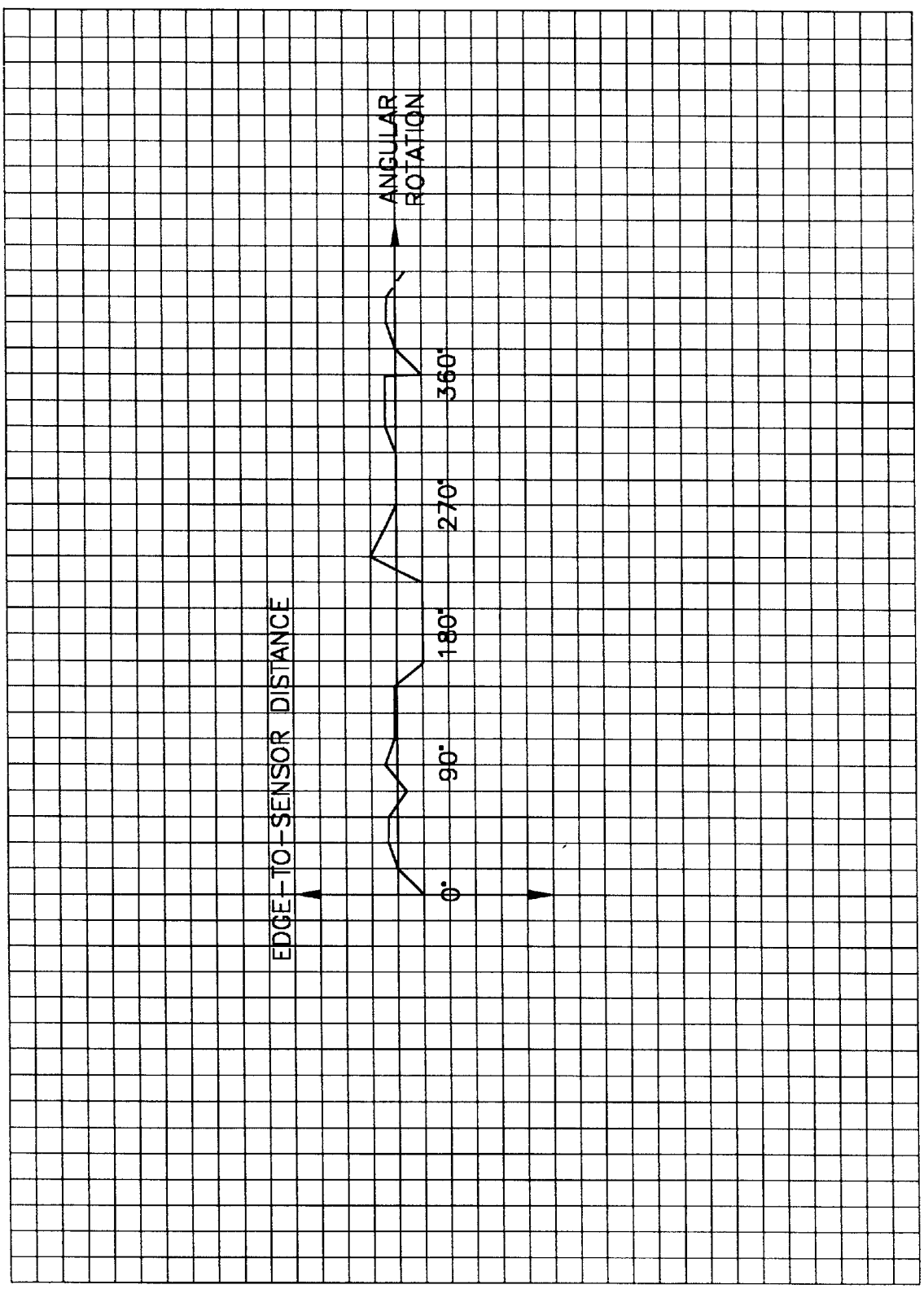
FIG. 7 is an exemplary disk profile based on edge proximity sensing in accordance with the present invention as shown in FIGS. 4, 5 and 6.

An exemplary plot of the data is shown in FIG. 7 where the distance between the sensor 411 and the periphery of the disk varies with angular rotation when the read-write head is positioned over a predetermined edge-referencing track. The disk edge 415 is provided with a marker, such as a dimple having a depth relatively greater than any expected edge proximity deviations, to provide a signal indicative of a complete revolution, as shown in the plot at zero-degrees and 360-degrees. Any other known-manner marker can be employed.

During a drive boot-up 602 or following a known shock event 603, a disk slip test 604 is performed. A current profile for each disk is generated and stored 605 in a like manner as when creating the initial disk alignment profiles as explained above. The initial profile and the current profile can then be compared 606. When the initial profile and the current profile are substantially the same, namely when no slippage is found which would affect the head-to-track alignment based on the design criterion of the specific disk drive apparatus, the test is ended and the drive controller returned to the read-write mode 608. If a tolerance for proper head-to-track alignment has been exceeded in discovered differences between the initial and current profiles, data track distortion is plotted 609 as a function of angular rotation of the disk. The head-to-track drive servo algorithm of the specific disk drive apparatus is modified 610 accordingly to allow proper track following in future read-write operations.

Figure 5:
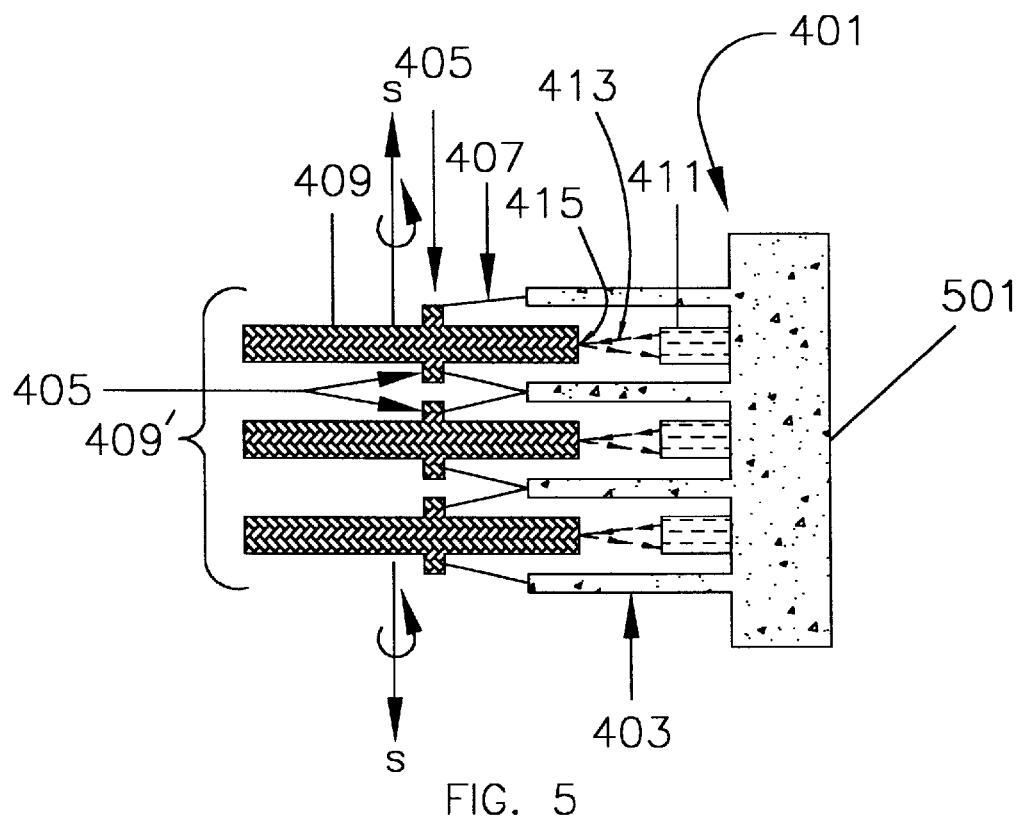
FIG. 5 is a schematic illustration, elevation view, of a second embodiment of the present invention.

FIG. 5 is another embodiment of the present invention where the sensors 411 are mounted to the E-block journal bearing 501 rather than on the cantilevers 403. But note that the present invention can also be used in a linear motion head actuator assembly rather than the rotary actuator shown. In a rotary actuator, as the sensors will move with the E-block, depending on the specific implementation and the amount of relative radial swing motion of the cantilevers, it may be appropriate to create the plots of disk edge proximity while the transducers are parked over a particular selected track, such as on or near a mid-disk track, as radial E-block motion during a test could affect readings. Plots subsequent to the initial plot should be made with the E-block in the same rotational position as when the initial plot readings were taken.

Figure 8:
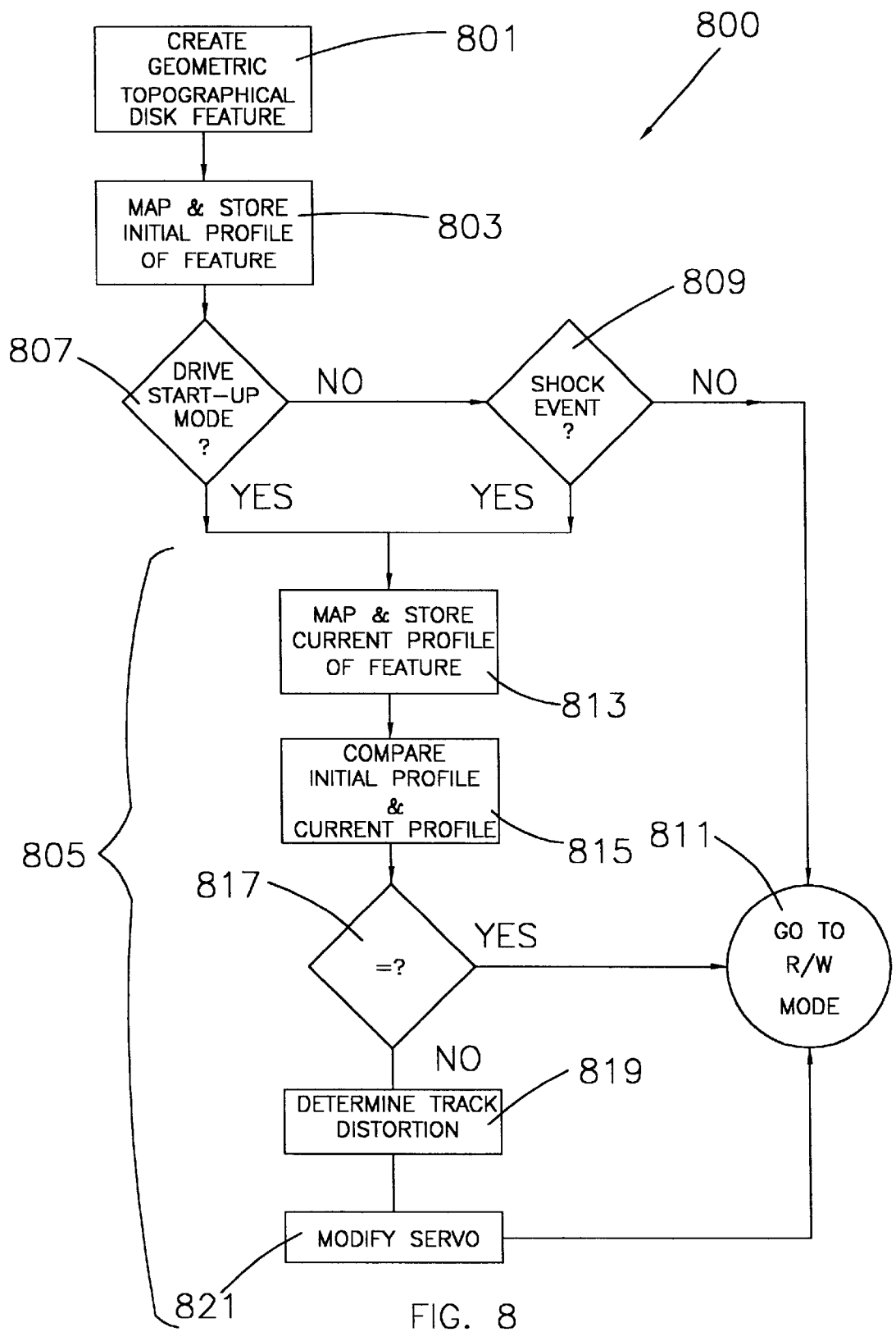
FIG. 8 is a flow chart of the methodology for determining and compensating for data track profile distortion due to disk shift in accordance with another embodiment of the present invention.

Referring now to FIGS. 8, 9A and 9B, a predetermined alignment feature 901 is embedded into the recording surfaces of a disk 903, step 801. FIG. 8 is similar in content to FIG. 6, but is included to facilitate description of further features and embodiments of the present invention.

Continuing the example of the just mentioned figures, a topographical geometric feature is formed on a predetermined track to be used for track alignment sensing using a commercial laser, shown herein as being near the disk 903 inner diameter 905. Any track or tracks may be selected for use as the alignment track with the predetermined alignment feature 901 as suits a particular implementation. As is known in the art, a change in spacing between the head and the disk surface can be recognized as magnetic or thermal flux variations using a magneto-resistive ("MR") head. For a magnetic disk, a sequential series of individual surface anomalies that are recognizable by the read head can be scribed or are embedded in the alignment track.

Thus, from a start/stop gap 907 of the feature 901, a series of surface anomalies is scribed along the predetermined alignment track which will induce a pattern of such effects in the read head when in a read-back-mode and aligned to that track as the disk 903 spins. While a variety of anomalies can be developed through testing, in the preferred embodiment a series of raised bumps that decrease the head-to-disk spacing by approximately fifty percent are scribed every 0.05 degrees about the alignment track. Note that in an alternative embodiment, these "anomalies" can also be continuous bump, which is concentric on the disk, or a like implementation expedient design. In commercial applications, each disk can be implanted with the alignment track feature before incorporation into a head-disk assembly.

Next, the alignment track is mapped and stored, step 803. The drive's read head is used in a read-back-mode to digitally describe an initial profile, or map, 909 of the alignment track. A digital pattern representation of the initial profile is stored as read-only data in a memory, such as an EPROM chip (not shown), by any known manner or proprietary data processing program.

The initial profile 909 is now available for use in various operational modes of the disk drive. Particularly in portable computers, it is advisable to run a disk shift test, step 805, on every boot-up 807 of the computer due to interim handling between usage. In programming computer boot routines, the disk shift test 805 can be auto-initialized or user-initialized; in an automated "wake-up" routine following a mere idle mode of operation, a drive is simply routed to its standard read-write mode, step 811. Following a known shock event 809, such as if a computer is severely jarred or dropped, a disk shift test 805 should be run even if the computer is already in the read-write mode. A simple, known manner, user initiated test program can be provided as part of the disk operating system.

When a disk shift test 805 is called for, a current profile 919, FIG. 9B, of the test track 907 is made and stored using the head in a read-back-mode, step 813, simply by running the read head about the alignment track, reading the predetermined feature 901, and storing the current profile. The two stored maps, the initial profile 909 and the current profile 919, are compared, step 815. If the maps are identical, or within a predetermined tolerance defined for a specific implementation knowing the drive's particular servo-tracking algorithm limitations, step 817, the system standard read-write mode can be initiated, step 811. If it is determined 819 that significant track distortion has occurred due to disk shift, FIG. 9B, the servo-tracking algorithm is modified 821 to conform track following in all future read-write mode operations 811. The servo-tracking modification is simple as the distortion is a direct function of track angular location to the initial configuration. Thus, the track position compensation value is a constant.

It should be recognized by a person skilled in the art that the anomalies intentionally provided in the predetermined alignment track or tracks can be of any type that is detectable by the read head. These topographical anomalies can be conformed to different technologies, magnetic, thermal, optical, or the like as may be available in the state of the art. It should also be recognized by a person skilled in the art that the data processing involved in mapping, storing, and comparing alignment track profiles can be implemented in either a firmware and semiconductor memory form or in software as part of a disk drive's software driver program.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiments were chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . "

What is claimed is:

1. A hard disk adapted for use as a memory apparatus, the disk comprising:

a substrate;

superjacent the substrate, at least one thin film layer associated with recording digital data in a plurality of tracks thereon; and at least one topographical anomaly located in a peripheral edge of the disk providing a marker such that proximity variations of the peripheral edge to an edge proximity detector can be plotted as a function of angular location with respect to the marker as the disk rotates about a fixed axis past the edge proximity detector.

2. A computer memory disk drive system comprising:

at least one recording disk having a plurality of concentric data tracks thereon, the disk having an outer diameter edge at a predetermined radius and a fixed axis of rotation;

at least one transducer positionable for at least reading information contained on the data tracks;

a transducer mount, movably mounted adjacent to the recording disk, for selectively positioning the transducer with respect to the concentric tracks on the disk; and at least one instantaneous proximity detector on the mount for detecting alignment of the transducer to the tracks.

3. The system as set forth in claim 2, the proximity detector further comprising:

means for determining variations of distance between the mount and the outer diameter edge as the disk rotates about the axis of rotation.

4. The system as set forth in claim 3, further comprising:

at least one topographical feature on the outer diameter edge such that the detector is usable as a means for forming an initial profile of the variations of distance between the mount and the outer diameter edge as a function of angular rotation of the disk with respect to the feature.

5. The system as set forth in claim 4, further comprising:

means for selectively forming a current profile of the variations of distance between the mount and the outer diameter edge as a function of angular rotation of the disk.

6. The system as set forth in claim 5, further comprising:

means for comparing the current profile to the initial profile.

7. The system as set forth in claim 6, further comprising:

means for resetting data track following of the transducer to compensate for differences between the initial profile and the current profile.

8. A disk drive read-write head gimbal assembly mount adapted for positioning at least one read-write transducer with respect to a rotating disk, the mount comprising:

body means for positioning the read-write transducer with respect to a recording surface of the rotating disk; and instantaneous proximity detecting means mounted on the body means for measuring proximity variations between the body means and the recording surface as the disk rotates past the detecting means.

\* \* \* \* \*